(12) United States Patent
Ding

(10) Patent No.: US 8,718,608 B2
(45) Date of Patent: May 6, 2014

(54) APPARATUS AND METHOD FOR UNLOCKING MOBILE PHONE

(75) Inventor: Luo Ding, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 13/574,423

(22) PCT Filed: Sep. 7, 2010

(86) PCT No.: PCT/CN2010/076697
§ 371 (c)(1),
(2), (4) Date: Jul. 20, 2012

(87) PCT Pub. No.: WO2011/153739
PCT Pub. Date: Dec. 15, 2011

(65) Prior Publication Data
US 2012/0289201 A1     Nov. 15, 2012

(30) Foreign Application Priority Data

Jun. 11, 2010  (CN) .......................... 2010 1 0197917

(51) Int. Cl.
*H04M 3/16*     (2006.01)
*H04W 12/00*    (2009.01)
*H04W 12/06*    (2009.01)
*H04W 12/08*    (2009.01)

(52) U.S. Cl.
CPC .............. *H04W 12/00* (2013.01); *H04W 12/06* (2013.01); *H04W 12/08* (2013.01)
USPC ......... 455/411; 455/550.1; 345/172; 345/173

(58) Field of Classification Search
CPC ...... H04W 12/00; H04W 12/06; H04W 12/08
USPC ....................................................... 455/411
See application file for complete search history.

(56) References Cited

U.S. PATENT DOCUMENTS

2006/0046694 A1*  3/2006  Yu .................................. 455/411
2008/0119217 A1*  5/2008  Coxhill ...................... 455/550.1
(Continued)

FOREIGN PATENT DOCUMENTS

CN     101379805 A     3/2009
CN     101471995 A     7/2009
(Continued)

OTHER PUBLICATIONS

International Search Report and English Translation mailed on Mar. 24, 2011 in corresponding International Application No. PCT/CN2010/076697, filed on Sep. 7, 2010.

*Primary Examiner* — Charles Appiah
*Assistant Examiner* — Mazda Sabouri
(74) *Attorney, Agent, or Firm* — Maier & Maier, PLLC

(57) ABSTRACT

The disclosure provides an apparatus and a method for unlocking a mobile phone. Both the apparatus and the method support the specific operations of a sensing component module, a judgment module and an unlocking performing module; wherein the sensing component module is configured to recording the time at which a user touches a first sensing component and a second sensing component, and transmitting the time to the judgment module; the judgment module is configured to judging whether an unlocking condition is satisfied according to the time at which the user touches a first sensing component and a second sensing component, and if yes, notifying the unlocking performing module to perform unlocking, if not, continuing being locked. The apparatus and method in the disclosure can reduce the probability of unlocking misoperations, and are convenient and rapid.

8 Claims, 5 Drawing Sheets

(56) References Cited

U.S. PATENT DOCUMENTS

| | | | |
|---|---|---|---|
| 2008/0290985 A1* | 11/2008 | Vogedes et al. | 340/3.1 |
| 2010/0020035 A1 | 1/2010 | Ryu et al. | |
| 2010/0079380 A1* | 4/2010 | Nurmi | 345/172 |
| 2010/0134434 A1* | 6/2010 | Tu | 345/173 |
| 2011/0081889 A1* | 4/2011 | Gao et al. | 455/411 |
| 2011/0237220 A1* | 9/2011 | Matsuoka | 455/411 |

FOREIGN PATENT DOCUMENTS

| | | |
|---|---|---|
| CN | 101634925 A1 | 1/2010 |
| WO | 2010043277 A1 | 4/2010 |

\* cited by examiner

APPARATUS AND METHOD FOR UNLOCKING MOBILE PHONE

RELATED APPLICATIONS

This is the U.S. national stage application which claims priority under 35 U.S.C. §371 to International Patent Application No. PCT/CN2010/076697, filed Sep. 7, 2010, which claims priority to Chinese Patent Application No. 201010197917.7, filed Jun. 11, 2010, the disclosures of which are incorporated by reference herein their entireties.

TECHNICAL FIELD

The disclosure relates to the technical field of mobile phones, in particular to an apparatus and a method for unlocking a mobile phone.

BACKGROUND

In this field, a mobile phone is always provided with devices such as a touch screen or a keyboard to interact with a user. However, a plurality of mobile phones have no outer protection device for such devices, resulting in a problem that when the devices are touched unintentionally by a user or other objects (for example, the touch screen is touched unintentionally or certain key of the keyboard is extruded by other objects), the functions unexpected by the user will be activated, which bring inconvenience for the user. Therefore, some mechanisms are needed to be introduced for locking of the mobile phone so as to prevent the misoperations. Accordingly, corresponding mechanisms are introduced for unlocking of the mobile phone.

Currently, there are two most widely applied unlocking ways for a mobile phone as follows: a combined-key unlocking way and a preset-gesture unlocking way. The combined-key unlocking is mainly used for a mobile phone with a keyboard, and without outer device, such as a clamshell or sliding closure, to protect the keyboard against the influence of the misoperations; and the unlocking is finished via the operations for specific key combinations (such as a straight mobile phone of Nokia with a keyboard). The preset-gesture unlocking is mainly used for a touch screen and is for unlocking the mobile phone by judging if the touch of the touch screen is consistent with pre-set gesture (such as iPhone of Apple Inc.). In addition, there are some other unlocking ways as follows: sound-control unlocking, password-setting unlocking and unlocking via drawing simple images on a touch screen.

At prevent, said unlocking ways have certain disadvantages as follows: the combined-key unlocking way is to unlock only when the user remembers the setting of the combined keys and relevant position exactly or observes the prompts on the display screen; and the preset-gesture unlocking way is to unlock only when the user watches the display screen and then places finger to the corresponding position of the display screen. Such problem is also existed in other unlocking ways. No doubt, such unlocking ways may improve the novelty of user, but when the unlocking is relatively frequent or immediate unlocking is needed (such as some emergencies), the unlocking ways are not very good in term of the convenience of the unlocking process.

SUMMARY

The purpose of the disclosure is to provide an apparatus of unlocking a mobile phone, to reduce the probability of unlocking misoperations, and is convenient and rapid;

another purpose of the disclosure is to provide a method for unlocking a mobile phone, to reduce the probability of unlocking misoperations, and is convenient and rapid.

In order to realize the purposes of the disclosure, the technical scheme of the disclosure is realized in such a way:

an apparatus for unlocking a mobile phone, may include a sensing component module, a judgement module and an unlocking performing module, wherein the sensing component module is configured to record the time at which a user touches a first sensing component and a second sensing component, and send recorded time to the judgement module; and the judgement module is configured to judge whether an unlocking condition is satisfied according to the time at which the user touches the first sensing component and the second sensing component; if yes, notify the unlocking performing module to perform unlocking, if not, maintain locking.

The sensing component module, may be further configured to record if a third to a $N^{th}$ sensing component are sensed, and send a result to the judgement module, wherein N is an integer greater than 2; and the judgement module, may be further configured to judge that the unlocking condition is satisfied according to the time at which the user touches the first sensing component and the second sensing component, and notify the unlocking module to perform unlocking when the third to the $N^{th}$ sensing component are sensed.

The unlocking condition in the judgement module may be as follows: the time at which the user touches the first sensing component and the second sensing component is recorded as t1 and t2; if $T\_min < |t1-t2| < T\_max$, the unlocking condition is satisfied; otherwise, the unlocking condition is unsatisfied.

The judgement module may further include a correction unit, configured to record time interval $t_i$ of each successful unlocking time, and calculate an expected time $t_e$ and a standard difference $t_d$ of the time differences of former N-time after the $N^{th}$ unlocking is finished, wherein $$t_e = \sum_N^{i=0} t_i;$$

$$t_d = \sqrt{\sum_N^{i=0} (t_i - t_e)^2};$$

and, reassign a value to the T\_min and T\_max by adding two values above with one pre-set error constant $t_c$, wherein $T\_min = t_e - t_d - t_c$; and $T\_max = t_e + t_d + t_c$.

The sensing component may be the sensing component on the touch screen of the mobile phone, or a sensing component arranged in a slot or an unlocking slot at the front, to back and side of a mobile phone.

A method for unlocking a mobile phone, may include the following steps:

recording the time at which a user touches a first sensing component and a second sensing component; and judging whether an unlocking condition is satisfied according to the time at which the user touches the first sensing component and the second sensing component, and if yes, performing unlocking; if not, maintaining locking.

Before the judgement, the method may further include the following steps:

recording if a third to a $N^{th}$ sensing component are sensed; and notifying, when judging that the unlocking condition is satisfied according to the time at which the user touches the first sensing component and the second sensing component, and when the third to the $N^{th}$ sensing component are sensed, the unlocking performing module to perform unlocking, wherein N is an integer greater than 2.

The unlocking condition may be as follows: the time at which the user touches the first sensing component and the second sensing component is recorded as t1 and t2; if T_min<|t1-t2|<T_max, the unlocking condition is satisfied; otherwise, the unlocking condition is unsatisfied.

The method may further include a correction step: recording time interval $t_i$ of each successful unlocking time; and calculating an expected time $t_e$ and a standard difference $t_d$ of the time differences of former N-time after the $N^{th}$ unlocking is finished, $$t_e = \sum_{N}^{i=0} t_i;$$

$$t_d = \sqrt{\sum_{N}^{i=0} (t_i - t_e)^2};$$

and, reassigning a value to the T_min and T_max by adding two values above with one pre-set error constant $t_c$, wherein T_min=$t_e$-$t_d$-$t_c$; and T_max=$t_e$+$t_d$+$t_c$.

The sensing component may be a sensing component on the touch screen of the mobile phone, or a sensing component arranged in a slot or an unlocking slot at the front, back and side of a mobile phone.

The beneficial effects of the disclosure are as follows: according to the apparatus and the method for unlocking the mobile phone of the disclosure, sensing components are introduced so that the user can finish the unlocking when getting the mobile phone without an interaction with the mobile phone. The unlocking caused by the misoperations or other unforeseen circumstances can be avoided extremely greatly while the convenience is kept; in addition, without introducing extra sensing component, the disclosure also can finish the unlocking function by utilizing the sensing components on the touch screen of the touch-screen mobile phone and keep the same effect as that of the preset-gesture unlocking way; and requirement for algorithm is more simple.

DETAILED DESCRIPTION

The apparatus and the method for unlocking the mobile phone disclosed by the disclosure are described below with reference to the attached FIGS. 1-7 in detail.

Figure 1:
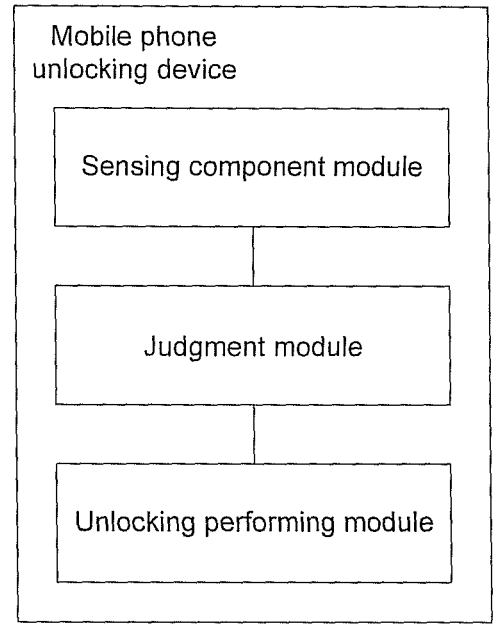
FIG. 1 is the structural diagram of a structure of an apparatus for unlocking a mobile phone of the disclosure.

As shown in FIG. 1, the apparatus for unlocking a mobile phone disclosed by the disclosure includes a sensing component module, a judgement module and an unlocking performing module, wherein the sensing component module is configured to record the time at which the user touches at least two sensing component and send recorded time to the judgement module; the judgement module is configured to judge whether an unlocking condition is satisfied according to the time at which the user touches a first sensing component and a second sensing component; if yes, notify the unlocking performing module to perform unlocking, if not, maintain locking.

The unlocking condition in the judgement module is as follows: the time at which is the user touches the first sensing component and the second sensing component is recorded as t1 and t2; if T_min<|t1-t2|<T_max, the unlocking condition is satisfied; otherwise, the unlocking condition is unsatisfied.

Embodiment 1

For the specific implementation, at least two sensing components are added to the mobile phone; then the two sensing components are touched by certain gesture of a finger; the time at which the two sensing components sense the touch of the finger is recorded as t1 and t2 respectively; and if T_min<|t1-t2|<T_max, the mobile phone is finished with the unlocking; otherwise, maintain locking.

Furthermore, for the specific implementation, a certain guide way may be set for a user so that the user can touch the sensing component via a regular way to enable the sensing time difference to be within a normal range and avoid the user from being unable to unlock via irregular way.

Furthermore, the mobile phone can further reduce the probability of unlocking misoperations via a third (or several) auxiliary sensing components. It is unnecessary for the sensing component(s) to record the sensing time, while whether the sensing components are sensed is needed to be recorded; then judges whether T_min<|t1-t2|<T_max and the sensing component(s) is (are) sensed are satisfied at the same time, if so, the unlocking is performed; and if one is unsatisfied, the locking is continued.

Furthermore, the mobile phone can also introduce machine learning algorithm to set the difference of the sensing time; a relatively wide time interval is set when the mobile phone left the factory; that is to say, the difference between the T_max and the T_min is increased; the factory pre-setting is used in the unlocking judgment of the mobile phone during the former N unlocking processes. The time interval $t_i$ for each successful unlocking is recorded; after the $N^{th}$ unlocking is finished, the expected time $t_e$ and the standard difference $t_d$ of the time differences of former N-time are calculated, $$t_e = \sum_{N-1}^{i=0} t_i; \quad (1)$$

$$t_d = \sqrt{\sum_{N-1}^{i=0} (t_i - t_e)^2}; \quad (2)$$

the T_min and T_max are reassigned with a value by adding two values above with a pre-set error constant $t_c$, wherein T_min=$t_e$-$t_d$-$t_c$; and T_max=$t_e$+$t_d$+$t_c$; the following unlocking judgement uses the new T_min and T_max. The upper limit and the lower is limit of the sensing time difference can be set again in mode of restoring factory settings and the like.

As the disclosure finishes the unlocking based on the sensing time difference, therefore the mobile phone needs two or more sensing components; and for the mobile phone without sensing component, two or more sensing components are needed to be added to accomplish the unlocking scheme.

Figure 2:
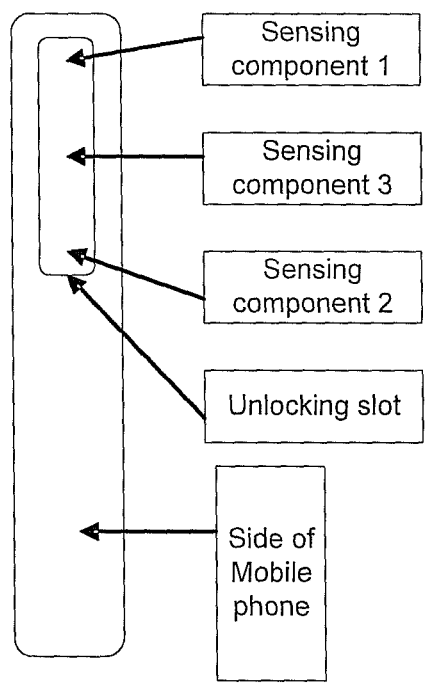
FIG. 2 is a setting schematic diagram of sensing components of the embodiment of the disclosure.
Figure 3:
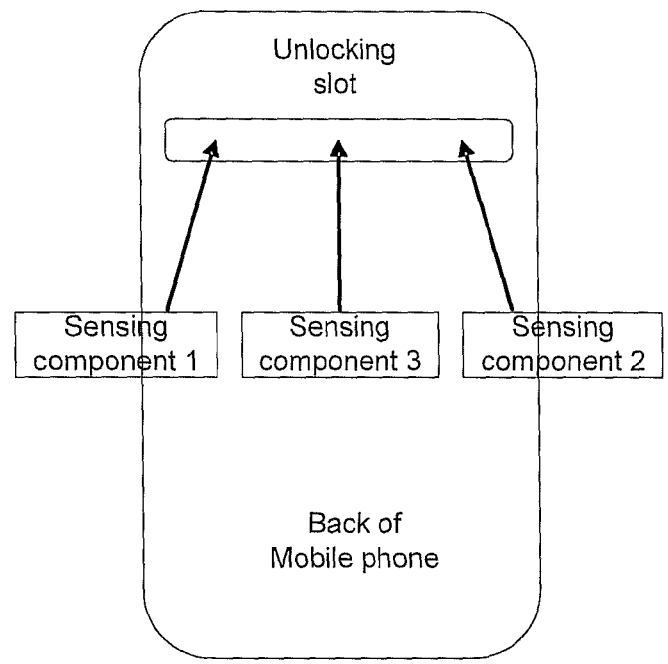
FIG. 3 is a setting schematic diagram of sensing components of the embodiment of the disclosure.

Specifically, as shown in FIG. 2, a section of shallow slot (an unlocking slot) is placed on the upper side of the right (left) side of the mobile phone; the unlocking slot is about 1.5-2 cm long; a sensing component is respectively arranged at the two ends of the unlocking slot; the sensing components at the two ends are respectively s1 and s2. In addition, the auxiliary sensing component at the middle part can be set as S3. As the mobile phone side is possibly to be used for some special purposes (such as a volume side key, a T card, a data line, an infrared and etc.), the unlocking slot also can be placed on the upper side of the back of the mobile phone; the utilization of such space is always low; an unlocking slot can be placed at the back of the mobile phone; the unlocking slot is 2-2.5 cm in length (or is determined according to the width of the mobile phone), as shown in FIG. 3. A sensing component is respectively arranged at the two ends of the unlocking slot. The sensing components at the two ends are respectively s1 and s2. In addition, the auxiliary sensing component at the middle part can be set as S3.

Embodiment 2

Figure 4:
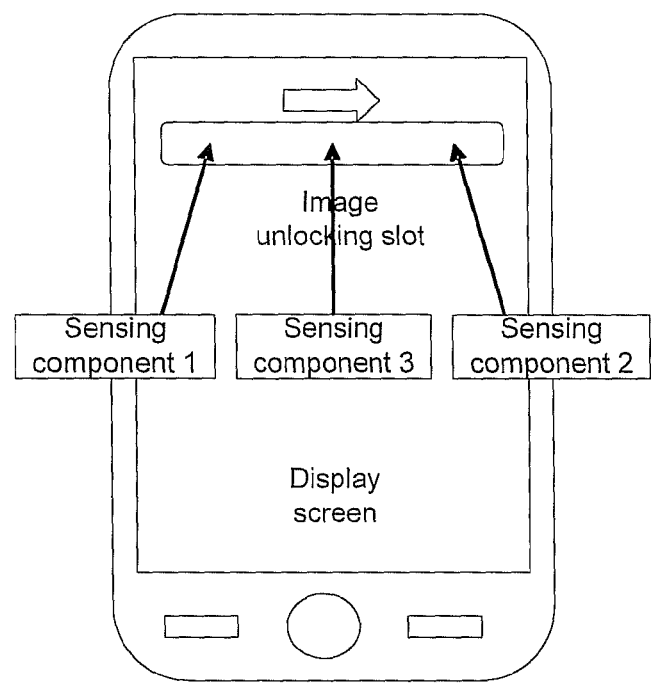
FIG. 4 is a setting schematic diagram of sensing components of the embodiment of the disclosure.

As the embodiment 1 needs the introduction of extra sensing component and appearance adjustment, the compatibility with the existing mobile phone is not very good. An algorithm also can utilize the sensing component on the touch screen of the existing mobile phone to finish the unlocking function. As shown in FIG. 4, the user needs to to interact with the display interface of the mobile phone during the unlocking process; the display screen of the mobile phone displays an unlocking slot image; and the unlocking is finished by utilizing the sensing components s1 and s2 near the two ends of the unlocking slot image; in addition, the unlocking also can be finished by further utilizing the auxiliary sensing component s3 at the middle part of the unlocking slot image. As the user needs to position on the display screen, therefore pay attention to not using the two sensing components at the two ends of the unlocking slot image. The distance between s1 and s2 can be set as 1.5-2 cm.

In addition, two constants, respectively as the upper limit and the lower limit of the unlocking time difference, are set in Non-Volatile storage (NV).

Via the sensing component of the display screen, although the unlocking convenience is reduced and the user needs the display interface for interaction during the unlocking process, the unlocking way can still realize the effect obtained via the preset-gesture unlocking way; and the algorithm is simpler. Some calculation expenses are only needed during the calculation of the expected time and the standard difference of the time difference. Once the upper limit and the lower limit of the time difference are determined, only a detection for three sensing points and one integral subtraction, and a comparison are needed (as the precision request of the time difference is low, there is no need to introduce extra floating-point calculation, and the millisecond level integer calculation is available); there is no need to detect the continuous contact with the display, the preset track judgement and the algorithm relating to vector operation such as presetting coordinates. As far as the reliability is considered, the probability of misoperation occurrence is low because sensing components at two specific positions are needed to be sensed within a ruled time difference. Meanwhile, the introduction of the auxiliary sensing component and the machine learning algorithm further reduce the probability of the misoperation, so that the unlocking caused by the misoperation is hard to occur.

In addition, the mobile phone above with touch screen can be unlocked either by existing sensing components or by adding two or more sensing components.

Moreover, when a user holds a mobile phone with left hand or right hand, it only needs to move thumb or forefinger a little to finish the unlocking. During the unlocking period, there is no need for the user to perform any interaction with the interface of the mobile phone, so that the unlocking can be almost finished while the mobile phone is in hand. The probability of misoperation occurrence is low because sensing components at two specific positions are needed to be sensed within a ruled time difference. The use of the unlocking slot can guide the user well to finish the unlocking operation; and the introduction of the auxiliary sensing component and the machine learning algorithm further reduce the probability of the misoperation, so that the unlocking caused by the misoperation is hardly to occur.

Figure 5:
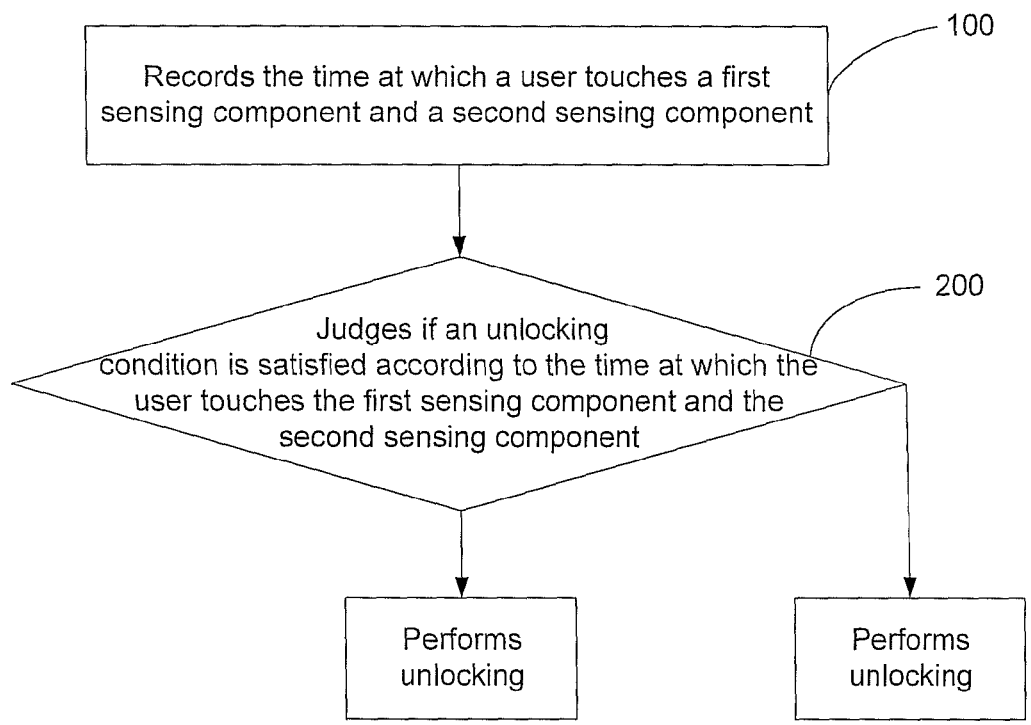
FIG. 5 is a flowchart of a method for unlocking a mobile phone of the disclosure.

As shown in FIG. 5, the method for unlocking the mobile phone of the disclosure includes the following steps:

step 100, recording the time at which the user touches the first sensing component and the second sensing component; and step 200, judging whether an unlocking condition is satisfied according to the time at which the user touches a first sensing component and a second sensing component, and if yes, performing unlocking; if not, maintaining locking.

The method further includes the following steps:

recording if a third to a $N^{th}$ sensing component are sensed; judging if the unlocking condition is satisfied according to the time at which the user touches the first sensing component and the second sensing component; and notifying the unlocking performing module to unlock when the third to the $N^{th}$ sensing component are sensed, wherein N is an integer greater than 2.

The unlocking condition is as follows: the time at which the user touches the first sensing component and the second sensing component is recorded as t1 and t2; if T_min<|t1-t2|<T_max, the unlocking condition is satisfied; otherwise, the unlocking condition is unsatisfied.

In addition, the method further includes a correction step: recording the time interval $t_i$ of each successful unlocking time; calculating the expected time $t_e$ and the standard difference $t_d$ of the time differences of former N-time after the $N^{th}$ unlocking is finished, $$t_e = \sum_{N-1}^{i=0} t_i \quad (1)$$

$$t_d = \sqrt{\sum_{N-1}^{i=0} (t_i - t_e)^2} \quad (2)$$

reassigning a value to the T_min and T_max by adding two values above with one pre-set error constant $t_c$, wherein T_min=$t_e$−$t_d$−$t_c$; and T_max=$t_e$+$t_d$+$t_c$.

The specific process is as follows:

the lower limit and the upper limit of the unlocking time differences are T_min and T_max; a counter is N; the array for storing the unlocking time difference is set as time[N]; wherein T_min=0.5 s; T_max=1.5 s; N=50; and time[N] is initialized as zero. When the user intends to unlock, a finger is placed in the unlocking slot at the mobile phone side to slide through the whole unlocking slot naturally. If s1 and s2 are sensed, the systemic time at this moment is recorded respectively as t1 and t2.

For example, two constants, respectively as the upper limit and the lower limit of the unlocking time difference, are set in the Non-Volatile storage (NV), which can be set as 0.5 sec and 1.5 sec here; in addition, the NV is provided with a counter N (set as 50 here) and an integral array with the dimension as the counter value; when the user unlocks successfully, the counter is decreased progressively into N−1; the time difference of the successful unlocking is written into the array; once the counter is decreased progressively into zero, the time difference of the unlocking is no longer stored, but the expected time and the standard difference of the unlocking time differences of former N-time are calculated through the array; the upper limit and the lower limit of a new unlocking time difference are calculated through the expected time and the standard difference; as the upper limit and the lower limit of the time difference are generated through learning and statistic for user behaviour, a higher accuracy is obtained and the probability of unlocking caused by misoperation can be further reduced. The new upper limit and the new lower limit being set, can be changed by recovering the factory setting or providing a special menu option, so that the upper limit and the lower limit of the unlocking time can be calculated again by resetting the upper limit and the lower limit of the unlocking time, and the counter and the corresponding array.

Figure 6:
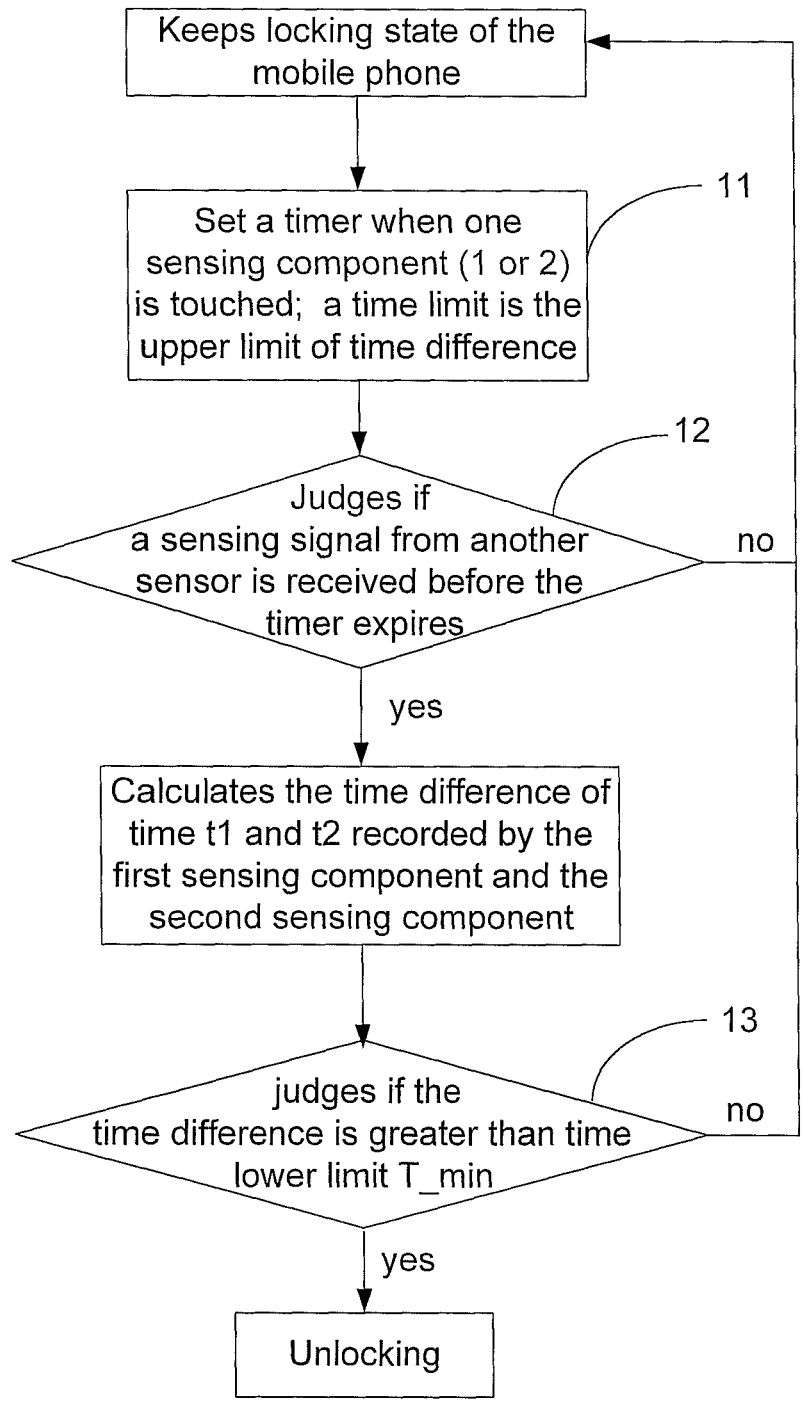
FIG. 6 is a flowchart of a method for unlocking a mobile phone of the embodiment of the disclosure.

As shown in FIG. 6, the flow of the unlocking method of the embodiment of the disclosure specifically includes the following steps:

step 11, setting one timer with time T_max if any one of the sensing component s1 and s2 is sensed when the mobile phone is kept at locking state;

step 12, judging if a sensing signal from another sensor is received before the timer expires; if so, calculating the time difference Δt=|t1-t2| of time t1 and t2 recorded by the two sensing components, and performing step 13; otherwise, maintaining locking;

step 13, judging if Δt is greater than the lower limit T_min; if so, performing unlocking; otherwise, maintaining locking, wherein before calculating the time difference, step 11 further includes the following steps:

judging if s3 is sensed, if so, calculating time difference Δt=|t1-t2 |,if Δt is greater than the time lower limit T_min, performing unlocking and step 12; otherwise, maintaining locking.

Figure 7:
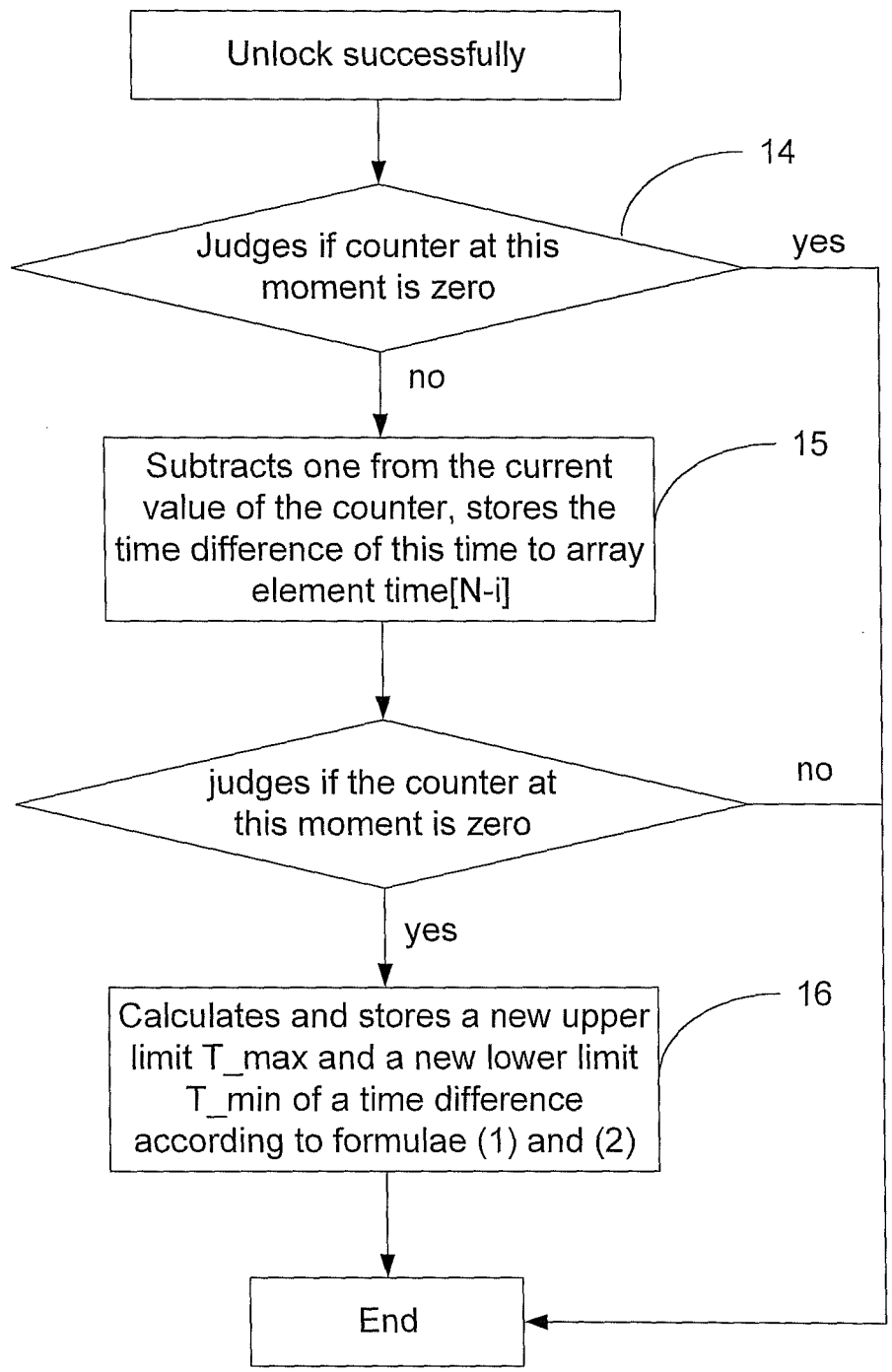
FIG. 7 is a flowchart of a method for correcting an upper limit and a lower limit of an unlocking time difference of a mobile phone.

In addition, as shown in FIG. 7, after step 13, the method may further include the following steps:

step 14, after successful unlocking, judging if the counter at this moment is zero; if so, ending the process; otherwise, performing step 15;

step 15, subtracting one from the current value of the counter; storing the time difference Δt of this time into array element time[N-i], wherein i is the number of times of unlocking time; then judging if the counter is zero; if not, ending the process; otherwise, performing step 16; and step 16, calculating and storing a new upper limit T_min and a new lower limit T_max of time difference according to formulae (1) and (2).

In conclusion, according to the apparatus and the method for unlocking the mobile phone of the disclosure, sensing components are introduced so that the user can finish the unlocking when getting the mobile phone without an interaction with the mobile phone. The unlocking caused by the misoperations or other unforeseen circumstances can be avoided extremely greatly while the convenience is kept; in addition, without introducing extra sensing component, the disclosure also can finish the unlocking function by utilizing the sensing components on the touch screen of the touch-screen mobile phone and keep the same effect as that of the preset-gesture unlocking way; and requirement for algorithm is more simple.

In order to enable the normal technicians in the field to understand the disclosure, the above is a detailed description for the disclosure. But it is conceivable that other changes and modifications can be done within the coverage extension of the claims of the disclosure; and such changes and modifications shall fall within the scope of protection of the disclosure.

The invention claimed is:

1. A mobile phone comprising a first sensing component, a second sensing component, a sensing component module, a judgement module and an unlocking performing module, wherein the sensing component module is configured to record the time at which a user touches the first sensing component and the second sensing component, and send recorded time to the judgement module; and the judgement module is configured to judge whether an unlocking condition is satisfied according to the time at which the user touches the first sensing component and the second sensing component; if yes, notify the unlocking performing module to perform unlocking, if not, maintain locking, wherein the unlocking condition in the judgement module is as follows: the time at which the user touches the first sensing component and the second sensing component is recorded as t1 and t2; if T min<|t1-t2|<T max, the unlocking condition is satisfied;

otherwise, the unlocking condition is unsatisfied;

wherein the judgement module further comprises a correction unit, configured to record time interval $t_i$ of each successful unlocking time, and calculate an expected time $t_e$ and a standard difference $t_d$ of the time differences of former N-time after the $N^{th}$ unlocking is finished, wherein $$t_e = \sum_{N}^{i=0} t_i;$$

$$t_d = \sqrt{\sum_{N}^{i=0} (t_i - t_e)^2};$$

and, reassign a value to the T min and T max by adding t.sub.e and t.sub.d with one pre-set error constant $t_c$, wherein T min=$t_e$−$t_{d-tc}$; and T max=$t_e$+$t_d$+$t_c$.

2. The mobile phone according to claim 1, wherein the mobile phone further comprises a third to a $N^{th}$ sensing components, the sensing component module, is further configured to record if the third to the $N^{th}$ sensing components are sensed, and send a result to the judgement module, wherein N is an integer greater than 2; and the judgement module, is further configured to judge that the unlocking condition is satisfied according to the time at which the user touches the first sensing component and the second sensing component, and notify the unlocking module to perform unlocking when the third to the $N^{th}$ sensing components are sensed.

3. The mobile phone according to claim 1, wherein the first or the second sensing component is arranged on a touch screen of the mobile phone or arranged in a slot or an unlocking slot at the front, back and side of the mobile phone.

4. A method for unlocking a mobile phone, comprising the following steps:

recording the time at which a user touches a first sensing component and a second sensing component; and judging whether an unlocking condition is satisfied according to the time at which the user touches the first sensing component and the second sensing component, and if yes, performing unlocking; if not, maintaining locking, wherein the unlocking condition is as follows: the time at which the user touches the first sensing component and the second sensing component is recorded as t1 and t2; if T min<|t1-t2|<T max, the unlocking condition is satisfied; otherwise, the unlocking condition is unsatisfied;

wherein the method for unlocking a mobile phone further comprises a correction step:

recording time interval $t_i$ of each successful unlocking time; and calculating an expected time $t_e$ and a standard difference $t_d$ of the time differences of former N-time after the $N^{th}$ unlocking is finished, $$t_e = \sum_N^{i=0} t_i;$$

$$t_d = \sqrt{\sum_N^{i=0} (t_i - t_e)^2} \ ;$$

and, reassigning a value to the T min and T max by adding t.sub.e and t.sub.d with one pre-set error constant $t_c$, wherein T min=$t_e$−$t_d$−$t_c$; and T max=$t_e$+$t_d$+$t_c$.

5. The method for unlocking the mobile phone according to claim 4, before the judgement, the method further comprising the following steps:

recording if a third to a $N^{th}$ sensing component are sensed; and notifying, when judging that the unlocking condition is satisfied according to the time at which the user touches the first sensing component and the second sensing component, and when the third to the $N^{th}$ sensing component are sensed, the unlocking performing module to perform unlocking, wherein N is an integer greater than 2.

6. The method for unlocking the mobile phone according to claim 4, wherein the first or the second sensing component is arranged on a touch screen of the mobile phone or arranged in a slot or an unlocking slot at the front, back and side of the mobile phone.

7. The mobile phone according to claim 2, wherein the first to the $N^{th}$ sensing components each is arranged on a touch screen of the mobile phone or arranged in a slot or an unlocking slot at the front, back and side of the mobile phone.

8. The method for unlocking the mobile phone according to claim 5, wherein the first to the $N^{th}$ sensing components each is arranged on a touch screen of the mobile phone or arranged in a slot or an unlocking slot at the front, back and side of the mobile phone.

* * * * *